(12) United States Patent  
Tanaka et al.

(10) Patent No.: US 8,346,015 B2  
(45) Date of Patent: Jan. 1, 2013

(54) IMAGE PROCESSING METHOD, PROGRAM, AND IMAGE PROCESSING APPARATUS ARRANGING A PLURALITY OF IMAGES TO MAKE A UNIFORM FACE SIZE OF PERSON FOR LAYOUT IMAGE

(75) Inventors: Eiji Tanaka, Hokkai-do (JP); Satoru Nishio, Hokkai-do (JP)

(73) Assignee: Seiko Epson Corporation, Tokyo (JP)

( * ) Notice: Subject to any disclaimer, the term of this patent is extended or adjusted under 35 U.S.C. 154(b) by 554 days.

(21) Appl. No.: 12/630,634

(22) Filed: Dec. 3, 2009

(65) Prior Publication Data

US 2010/0189355 A1      Jul. 29, 2010

(30) Foreign Application Priority Data

Jan. 29, 2009   (JP) .................................. 2009-017995

(51) Int. Cl.
- *G06K 9/36*   (2006.01)
- *G06K 9/32*   (2006.01)
- *G06K 15/00*  (2006.01)
- *G09G 5/00*   (2006.01)

(52) U.S. Cl. ........ 382/284; 382/298; 358/1.18; 345/619

(58) Field of Classification Search .................. 382/284  
See application file for complete search history.

(56) References Cited

U.S. PATENT DOCUMENTS

| | | | | |
|---|---|---|---|---|
| 6,934,052 | B2 * | 8/2005 | Venable | 358/1.18 |
| 7,573,486 | B2 * | 8/2009 | Mondry et al. | 345/619 |
| 7,576,755 | B2 * | 8/2009 | Sun et al. | 345/629 |
| 2005/0220345 | A1 * | 10/2005 | Chiu et al. | 382/190 |
| 2007/0058884 | A1 * | 3/2007 | Rother et al. | 382/284 |
| 2007/0237421 | A1 * | 10/2007 | Luo et al. | 382/284 |
| 2008/0075390 | A1 * | 3/2008 | Murai et al. | 382/284 |
| 2008/0123993 | A1 * | 5/2008 | Widdowson | 382/284 |
| 2008/0205789 | A1 * | 8/2008 | Ten Kate et al. | 382/284 |
| 2008/0278737 | A1 * | 11/2008 | Kajihara et al. | 358/1.9 |
| 2009/0015869 | A1 * | 1/2009 | Quek et al. | 358/1.18 |
| 2010/0058437 | A1 * | 3/2010 | Liew et al. | 726/2 |

FOREIGN PATENT DOCUMENTS

| | | |
|---|---|---|
| JP | 2007-104563 A | 4/2007 |
| JP | 2007-219878 A | 8/2007 |

* cited by examiner

*Primary Examiner* — David Zarka  
(74) *Attorney, Agent, or Firm* — Global IP Counselors, LLP

(57) ABSTRACT

The image processing method includes: (a) detecting a face area or face areas in each of the plurality of images; (b) setting an all-face-inclusion area that includes all of the face areas detected in the operation (a) for each of the plurality of images; (c) setting a plurality of unit areas where the images are to be arranged by dividing the layout area on the basis of the number of the images and the layout area itself; (d) selecting a maximum-face-number image, which is an image that includes the maximum number of the face areas detected in the operation (a).

10 Claims, 10 Drawing Sheets

LAYOUT IMAGE

IMAGE PROCESSING METHOD, PROGRAM, AND IMAGE PROCESSING APPARATUS ARRANGING A PLURALITY OF IMAGES TO MAKE A UNIFORM FACE SIZE OF PERSON FOR LAYOUT IMAGE

BACKGROUND

1. Technical Field

The present invention relates to an image processing method, a program, and an image processing apparatus.

2. Related Art

An image processing method for creating a layout image by sequentially arranging a plurality of layout target images, which are images that are to be arranged over a base image, thereon is proposed in the art. An example of such an image processing method is disclosed in JP-A-2007-219878. According to the proposed method, a layout image can be created as follows. One layout target image that includes the largest number of persons as image content is selected among the plurality of layout target images. The size of the selected layout target image is increased. The enlarged image is placed first on the base image. Thereafter, the remaining layout target images are arranged sequentially. In the sequential arrangement, each layout target image is placed in such a way as to ensure that the layout target image that is currently in the arrangement process does not overlap any face area that is included in an already-arranged image(s), which is a layout target image that has already been arranged over the base image. In addition, in the sequential arrangement, each layout target image is placed in such a way as to ensure that the distance between the center of gravity of face areas included in all of the already-arranged images over the base image and the center of gravity of face areas included in the currently arranged layout target image is minimized. By this means, it is possible to obtain a layout image that includes the enlarged layout target image including the largest number of persons.

However, the related-art image processing method described above has a problem in that a face area that is extremely large or extremely small might be included in a final layout image in a case where, for example, there are two or more layout target images that include the same number of persons.

SUMMARY

An advantage of some aspects of the invention is to provide an image processing method that makes the face size of persons included in a created layout image uniform as much as possible when creating the layout image by arranging a plurality of images in a layout area where images can be arranged. In addition, the invention provides a program and an image processing apparatus as other facets thereof.

In order to address the above-identified problem without any limitation thereto, an image processing method, a program, and an image processing apparatus according to an aspect of the invention adopts any of the following novel and inventive features.

As an aspect thereof, the invention provides an image processing method for creating a layout image by arranging a plurality of images in a layout area where images can be arranged. An image processing method according to a first aspect of the invention includes: (a) detecting a face area or face areas in each of the plurality of images; (b) setting an all-face-inclusion area that includes all of the face areas detected in the face area detection operation [operation (a)] for each of the plurality of images; (c) setting a plurality of unit areas where the images are to be arranged by dividing the layout area on the basis of the number of the images and the layout area itself; (d) selecting a maximum-face-number image, which is an image that includes the maximum number of the face areas detected in the face area detection operation [operation (a)], as a reference image among the plurality of images, adjusting the size of the reference image while keeping the horizontal-to-vertical ratio of the reference image within a range that ensures that the size of the reference image after the adjustment is not smaller than the size of a unit area set in the unit area setting operation [operation (c)] and that the all-face-inclusion area set in the all-face-inclusion area setting operation [operation (b)] is included in the unit area set in the unit area setting operation [operation (c)], and setting the size of one face area that is the largest among the face areas detected in the face area detection operation [operation (a)] after the size adjustment as a reference face size; (e) adjusting the size of each of the remaining images, which excludes the reference image, while keeping the horizontal-to-vertical ratio of the image within a range that ensures that the size of the image after the adjustment is not smaller than the size of a unit area set in the unit area setting operation [operation (c)] and that the all-face-inclusion area set in the all-face-inclusion area setting operation [operation (b)] is included in the unit area set in the unit area setting operation [operation (c)] in such a way as to approximate the size of the largest face area included in the image to the reference face size; and (f) creating a layout image by sequentially arranging the images at the unit areas set in the unit area setting operation [operation (c)] with trimming at a border between the unit area where the image is currently arranged and an adjacent unit area where another image has already been arranged in preceding or previous arrangement processing, if any, besides trimming of any part of the image outside the layout area.

An image processing method according to the first aspect of the invention includes the following operations. A face area or face areas is/are detected in each of the plurality of images. An all-face-inclusion area that includes all of the detected face areas is set for each of the plurality of images. A plurality of unit areas where the images are to be arranged is set by dividing the layout area on the basis of the number of the images and the layout area itself. A maximum-face-number image, which is an image that includes the maximum number of the detected face areas, is selected as a reference image among the plurality of images. The size of the reference image is adjusted while keeping the horizontal-to-vertical ratio of the reference image within a range that ensures that the size of the reference image after the adjustment is not smaller than the size of a unit area and that the all-face-inclusion area is included in the unit area. The size of one face area that is the largest among the face areas after the size adjustment is set as a reference face size. The size of each of the remaining images, which excludes the reference image, is adjusted while keeping the horizontal-to-vertical ratio of the image within a range that ensures that the size of the image after the adjustment is not smaller than the size of a unit area and that the all-face-inclusion area is included in the unit area in such a way as to approximate the size of the largest face area included in the image to the reference face size. A layout image is created by sequentially arranging the images at the unit areas with trimming at a border between the unit area where the image is currently arranged and an adjacent unit area where another image has already been arranged in preceding or previous arrangement processing, if any, besides trimming of any part of the image outside the layout area. With this method, it is possible to make the size of the face areas included in the images uniform as much as possible, which ensures that the face size of persons included in the created layout image is substantially uniform. Since the size of each of the images is adjusted within a range that ensures that the size of the image after the adjustment is not smaller than the size of a unit area when the images are arranged at the unit areas, it is possible to avoid any area space to be left blank in the unit areas where the images are arranged. As described above, the size of each of the images is adjusted within a range that ensures that the all-face-inclusion area is included in the unit area. The images are sequentially arranged at the unit areas with trimming at a border between the unit area where the image is currently arranged and an adjacent unit area where another image has already been arranged in preceding or previous arrangement processing, if any. Therefore, it is possible to ensure that no face of a person(s) in the image is hidden.

In an image processing method according to the first aspect of the invention, it is preferable that the all-face-inclusion area setting operation [operation (b)] should be processing of setting the all-face-inclusion area that has a rectangular shape for each of the plurality of images; the unit area setting operation [operation (c)] should be processing of setting the plurality of unit areas each of which has a rectangular shape by dividing the layout area; and the reference setting operation [operation (d)] should be processing of adjusting the size of the reference image within a range that ensures that the all-face-inclusion area set in the all-face-inclusion area setting operation [operation (b)] is included in the unit area set in the unit area setting operation [operation (c)] in such a manner that two sides of the all-face-inclusion area of the reference image that are parallel to each other are on boundary of the unit area. With such a preferred method, it is possible to make the reference face size relatively large.

In an image processing method according to the first aspect of the invention, it is preferable that the reference setting operation [operation (d)] should be processing of selecting one image that has a larger or the largest horizontal-to-vertical ratio of the all-face-inclusion area as the reference image if the number of the maximum-face-number images is two or greater, adjusting the size of the reference image, and setting the reference face size. With such a preferred method, it is possible to determine the reference image appropriately.

In an image processing method according to the first aspect of the invention, it is preferable that the layout image creation operation [operation (f)] should be processing of setting an arrangement order for arranging each of the plurality of images at the corresponding one of the plurality of unit areas set in the unit area setting operation [operation (c)] according to conditions that include arrangement in ascending order of the number of the face areas of the plurality of images, which are detected in the face area detection operation [operation (a)], and arranging the plurality of images sequentially in the layout area first at areas that are relatively remote from the center of the layout area before arrangement at central areas. With such a preferred method, among the plurality of images, it is possible to arrange images that include a relatively large number of face areas at the center of the layout area or at center-side areas, which are relatively close to the center of the layout area. In other words, it is possible to arrange images that are placed later at the center area or at the center-side areas.

In the preferred image processing method in which an arrangement order is set for arranging each of the plurality of images at the corresponding one of the plurality of unit areas according to conditions that include arrangement in ascending order of the number of the face areas of the plurality of images and which the plurality of images is arranged sequentially in the layout area first at areas that are relatively remote from the center of the layout area before arrangement at central areas, the unit area setting operation [operation (c)] may be processing of setting the boundary of the layout area as a trimming boundary, which is a boundary for trimming performed in the layout image creation operation [operation (f)], and setting at least some unit areas of the plurality of unit areas as arrangement areas, each of which is a unit area where no image has been arranged and, in addition, has at least one side on the trimming boundary; the layout image creation operation [operation (f)] may be processing that includes (f1) an image arrangement sub-operation, which is processing of arranging each of the plurality of images at the corresponding one of the plurality of arrangement areas sequentially in the arrangement order, and (f2) a resetting sub-operation, which is processing that includes resetting the trimming boundary in a case where, among the plurality of images, there is any yet-to-be-arranged image, which is an image that has not been arranged on the layout area yet, when images have been arranged at all of the arrangement areas, respectively, in such a way as to demarcate an area that includes all of yet-to-be-filled arrangement areas, which are unit areas where no image has been arranged yet, within a range that ensures that none of the face areas included in already-arranged images, which are images that have already been arranged, will be hidden, resetting the unit areas with the use of the reset trimming boundary, and resetting the arrangement areas with the use of the reset trimming boundary and the reset unit areas; the reference setting operation [operation (d)] may be processing of readjusting the size of the reference image on the basis of the reset unit areas and resetting the reference face size in a case where the unit areas are reset in the resetting sub-operation [sub-operation (f2)]; and the image size adjustment operation [operation (e)] may be processing of readjusting the size of each of the remaining images on the basis of the reset reference face size in a case where the reference face size is reset in the reference setting operation [operation (d)]. In a case where there is more than one face area included in the reference image, the reference face size set in the operation (d) is smaller than a unit area, and therefore, the size of a unit area that has been subjected to resetting through the sub-operation (f2) is usually larger than that before the resetting. Therefore, the reference face size that has been subjected to resetting through the operation (d) on the basis of the reset unit area is larger than that before the resetting. In addition, the size of each of the remaining images that has been subjected to readjustment through the operation (e) on the basis of the reset reference face size is larger than that before the readjustment. As a result, among the plurality of images, it is possible to increase the face-size of persons of images that include a relatively large number of face areas (i.e., images that are placed later in sequential arrangement). In the preferred image processing method described above, the resetting sub-operation [sub-operation (f2)] may be processing of resetting the trimming boundary in such a way as to demarcate a rectangular area that has a maximum size within a range that ensures that none of the face areas included in the already-arranged images will be hidden. In the preferred image processing method described above, the unit area setting operation [operation (c)] may be processing of setting the plurality of unit areas by equi-sectioning the layout area into the unit areas whose number is equal to or greater than the number of the plurality of images and is minimum among numbers that enable the layout area to be equi-sectioned while maintaining the horizontal-to-vertical ratio of the layout area within a predetermined range of tolerance, where the layout area is equi-sectioned on the basis of the number of the plurality of images to reset the plurality of unit areas in a case where the number of the plurality of unit areas is greater than the number of the plurality of images, and in addition, in a case where all of the unit areas are set as the arrangement areas; and the resetting sub-operation [sub-operation (f2)] may be processing of setting an entire area that is demarcated by the reset trimming boundary, that is, an entire trimming boundary area, as the reset unit area in a case where the number of the yet-to-be-arranged images is one or resetting the plurality of unit areas by equi-sectioning the trimming boundary area into the unit areas whose number is equal to or greater than the number of the yet-to-be-arranged images and is minimum among numbers that enable the trimming boundary area to be equi-sectioned while maintaining the horizontal-to-vertical ratio of the trimming boundary area within a predetermined range of tolerance, where the trimming boundary area is equi-sectioned on the basis of the number of the yet-to-be-arranged images to reset the plurality of unit areas in a case where the number of the plurality of unit areas is greater than the number of the yet-to-be-arranged images, and in addition, in a case where all of the unit areas are set as the arrangement areas. With this method, it is possible to set the plurality of unit areas by equi-sectioning the layout area into comparatively large areas while maintaining the horizontal-to-vertical ratio of the layout area within a predetermined range of tolerance. In addition, it is possible to avoid any unit area from being left as a blank area where no image will be placed in a case where the number of the unit areas is greater than the number of the yet-to-be-arranged images, and in addition, in a case where all of the unit areas are set as the arrangement areas.

In an image processing method according to the first aspect of the invention, it is preferable that the layout image creation operation [operation (f)] should be processing of arranging each of the plurality of images at the corresponding one of the plurality of unit areas set in the unit area setting operation [operation (c)] in such a way as to ensure that a distance between the center of the all-face-inclusion area set in the all-face-inclusion area setting operation [operation (b)] and the center of the unit area is small within a range in which no gap is formed in the unit area. With such a preferred method, it is possible to avoid the formation of any gap (e.g., blank space) in the unit area where the image is placed.

A program according to a second aspect of the invention causes at least one computer to execute the operations of an image processing method according to the first aspect of the invention described above. In its practical implementation, such a program may be stored in a computer-readable recording medium (e.g., a hard disk, ROM, FD, CD, DVD, and the like). Alternatively, it may be distributed from one computer to another computer via a transmission medium (a communication network such as the Internet, LAN, or the like). Notwithstanding the above, it may be sent/received through any other means. When the above program is executed either by a single personal computer or by a plurality of personal computers, the operations of an image processing method according to the first aspect of the invention described above are executed. Thus, a program according to the second aspect of the invention produces the same operation/working-effects that are achieved by an image processing method according to the first aspect of the invention.

As an aspect thereof, the invention provides an image processing apparatus for creating a layout image by arranging a plurality of images in a layout area where images can be arranged. An image processing apparatus according to a third aspect of the invention includes: a face area detection section that detects a face area or face areas in each of the plurality of images; an all-face-inclusion area setting section that sets an all-face-inclusion area that includes all of the detected face areas for each of the plurality of images; a unit area setting section that sets a plurality of unit areas where the images are to be arranged by dividing the layout area on the basis of the number of the images and the layout area itself; a reference face size setting section that selects a maximum-face-number image, which is an image that includes the maximum number of the detected face areas, as a reference image among the plurality of images, adjusts the size of the reference image while keeping the horizontal-to-vertical ratio of the reference image within a range that ensures that the size of the reference image after the adjustment is not smaller than the size of a set unit area and the set all-face-inclusion area is included in the set unit area, and sets the size of one face area that is the largest among the detected face areas after the size adjustment as a reference face size; a size adjustment section that adjusts the size of each of the remaining images, which excludes the reference image, while keeping the horizontal-to-vertical ratio of the image within a range that ensures that the size of the image after the adjustment is not smaller than the size of a set unit area and that the set all-face-inclusion area is included in the set unit area in such a way as to approximate the size of the largest face area included in the image to the reference face size; and a layout image creation section that creates a layout image by sequentially arranging the images at the set unit areas with trimming at a border between the unit area where the image is currently arranged and an adjacent unit area where another image has already been arranged in preceding or previous arrangement processing, if any, besides trimming of any part of the image outside the layout area.

An image processing apparatus according to the third aspect of the invention has the following features. A face area or face areas is/are detected in each of the plurality of images. An all-face-inclusion area that includes all of the detected face areas is set for each of the plurality of images. A plurality of unit areas where the images are to be arranged is set by dividing the layout area on the basis of the number of the images and the layout area itself. A maximum-face-number image, which is an image that includes the maximum number of the detected face areas, is selected as a reference image among the plurality of images. The size of the reference image is adjusted while keeping the horizontal-to-vertical ratio of the reference image within a range that ensures that the size of the reference image after the adjustment is not smaller than the size of a unit area and that the all-face-inclusion area is included in the unit area. The size of one face area that is the largest among the face areas after the size adjustment is set as a reference face size. The size of each of the remaining images, which excludes the reference image, is adjusted while keeping the horizontal-to-vertical ratio of the image within a range that ensures that the size of the image after the adjustment is not smaller than the size of a unit area and that the all-face-inclusion area is included in the unit area in such a way as to approximate the size of the largest face area included in the image to the reference face size. A layout image is created by sequentially arranging the images at the unit areas with trimming at a border between the unit area where the image is currently arranged and an adjacent unit area where another image has already been arranged in preceding or previous arrangement processing, if any, besides trimming of any part of the image outside the layout area. By this means, it is possible to make the size of the face areas included in the images uniform as much as possible, which ensures that the face size of persons included in the created layout image is substantially uniform. Since the size of each of the images is adjusted within a range that ensures that the size of the image after the adjustment is not smaller than the size of a unit area when the images are arranged at the unit areas, it is possible to avoid any area space to be left blank in the unit areas where the images are arranged. As described above, the size of each of the images is adjusted within a range that ensures that the all-face-inclusion area is included in the unit area. The images are sequentially arranged at the unit areas with trimming at a border between the unit area where the image is currently arranged and an adjacent unit area where another image has already been arranged in preceding or previous arrangement processing, if any. Therefore, it is possible to ensure that no face of a person(s) in the image is hidden.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
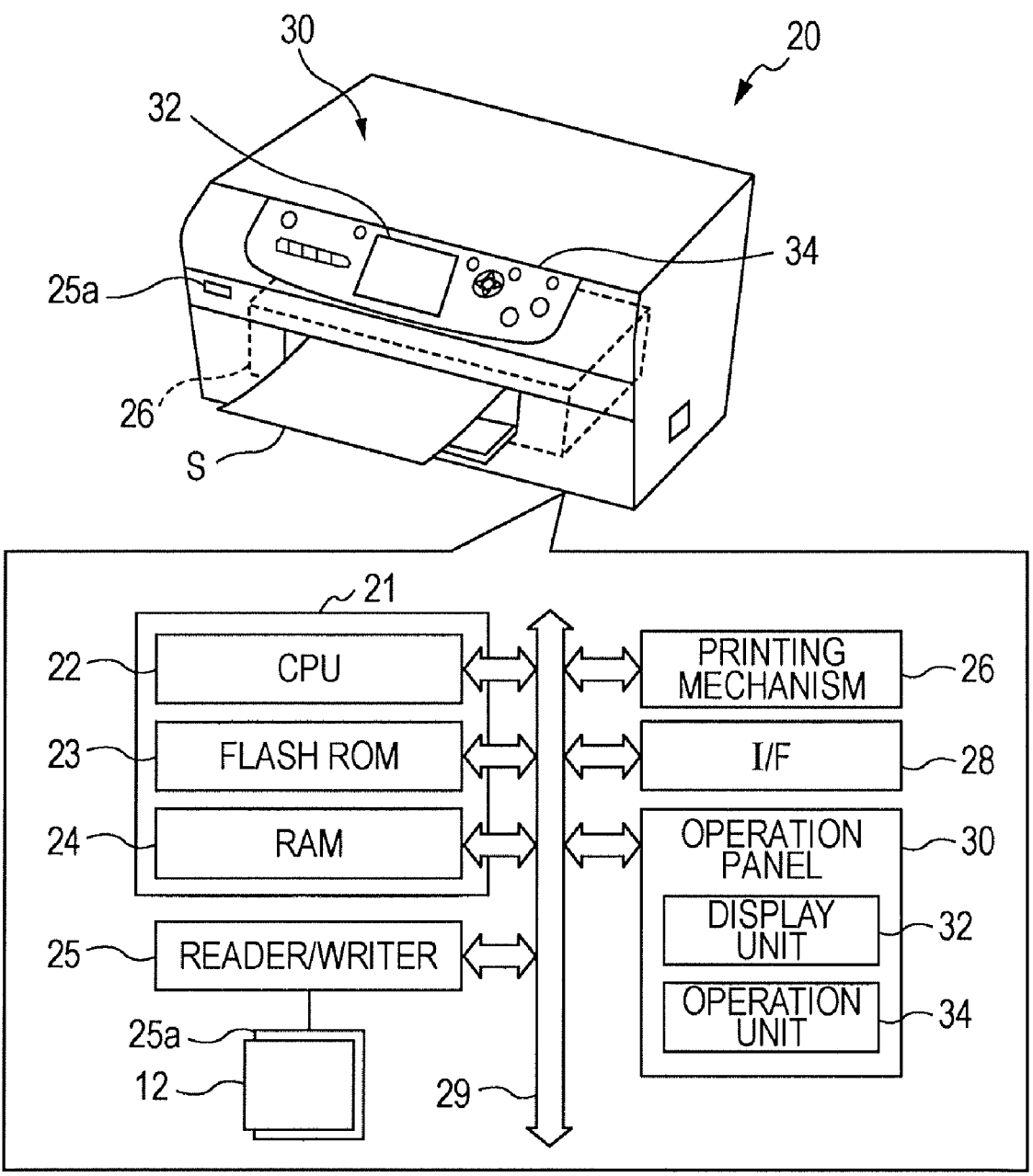
FIG. 1 is a diagram that schematically illustrates an example of the configuration of a printer according to an exemplary embodiment of the invention.

With reference to the accompanying drawings, an exemplary embodiment of the present invention will now be explained. FIG. 1 is a diagram that schematically illustrates an example of the configuration of a printer 20 according to an exemplary embodiment of the invention. The printer 20 is provided with a controller 21, a reader/writer 25, a printing mechanism 26, an input/output interface (I/F) 28, and an operation panel 30. The controller 21 controls the entire operation of the printer 20. The reader/writer 25 has a slot 25a in which a memory card 12 can be inserted in a removable manner. The memory card 12 is a kind of a portable storage medium. The printing mechanism 26 prints an image on a print target medium such as a label surface of a doughnut-type disc that conforms to the standard specifications. Information sent from an external device that is connected to the printer 20 is received at the I/F 28. The printer 20 sends information to the external device via the I/F 28. The operation panel 30 displays information. In addition, the operation panel 30 accepts the input of user instructions. The controller 21, the reader/writer 25, the printing mechanism 26, the I/F 28, and the operation panel 30 are electrically connected to one another via a bus 29. The controller 21 is a microprocessor that includes a CPU 22 as its central processor. The controller 21 is provided with a flash ROM 23 and a RAM 24 besides the CPU 22. The flash ROM 23 is a writable-and-erasable ROM that memorizes various processing programs. The RAM 24 stores data temporarily. The printing mechanism 26 is an ink-jet print unit, which performs print processing in an ink-jet scheme. Although the specific mechanism thereof is not illustrated in the accompanying drawings, the printing mechanism 26 is provided with a pressure generation structure to apply pressure to ink corresponding to each color component. The printing mechanism 26 ejects pressurized ink onto a print target medium S. The deformation of piezoelectric elements may be utilized for pressurizing ink. Or, a thermal ink-ejecting scheme that utilizes air bubbles may be adopted for applying pressure to ink. In the thermal ejection scheme, a heater generates heat so as to form air bubbles. Any other ink pressurization scheme may be used. The operation panel 30 is a user input interface device that allows a user to input various kinds of commands/instructions into the printer 20. The operation panel 30 is provided with a display unit 32 and an operation unit 34. The display unit 32 is, for example, a color liquid crystal display panel that displays various kinds of characters and images in response to various user instructions. The operation unit 34 is used when a user performs various input operations. The memory card 12 is a writable-and-erasable nonvolatile memory. A plurality of image files and the like that contain images photographed by a photographing apparatus such as a digital camera is stored in the memory card 12.

Figure 2:
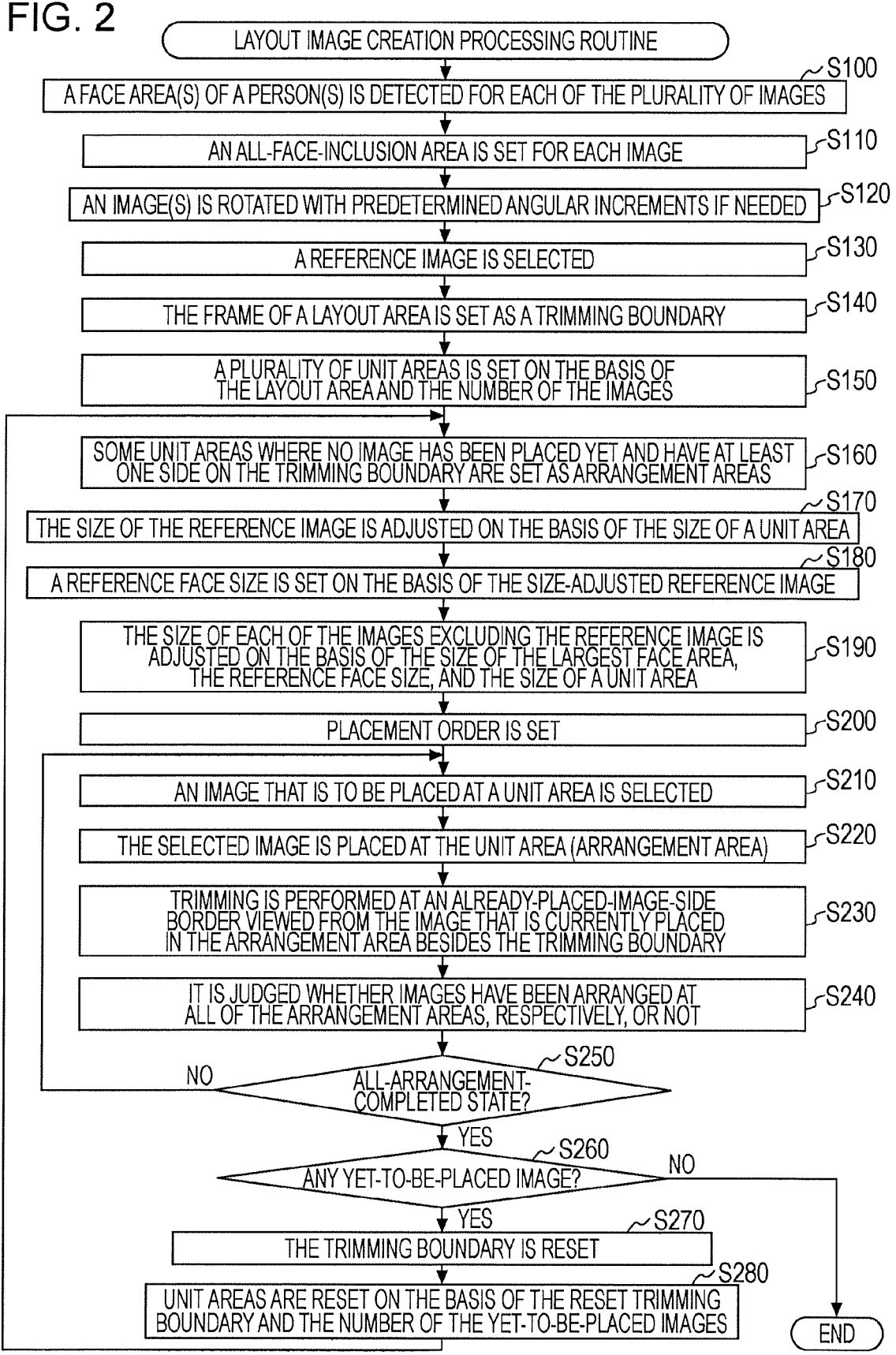
FIG. 2 is a flowchart that schematically illustrates an example of a layout image creation processing routine according to an exemplary embodiment of the invention.

Next, the operation of the printer 20 having the above configuration is explained. In particular, the creation of a layout image by arranging a plurality of images selected by a user in a layout area is explained below. The layout area is an area where images can be arranged. FIG. 2 is a flowchart that schematically illustrates an example of a layout image creation processing routine that is executed by the CPU 22 of the printer 20. The routine is stored in the flash ROM 23. The routine is executed when a user operates the operation unit 34 to select a plurality of images that is to be arranged in the layout area among a plurality of images stored in the memory card 12. In the following description of the present embodiment of the invention, the creation of a layout image by arranging sixteen images selected by a user in a rectangular layout area is taken as an example.

Figure 3:
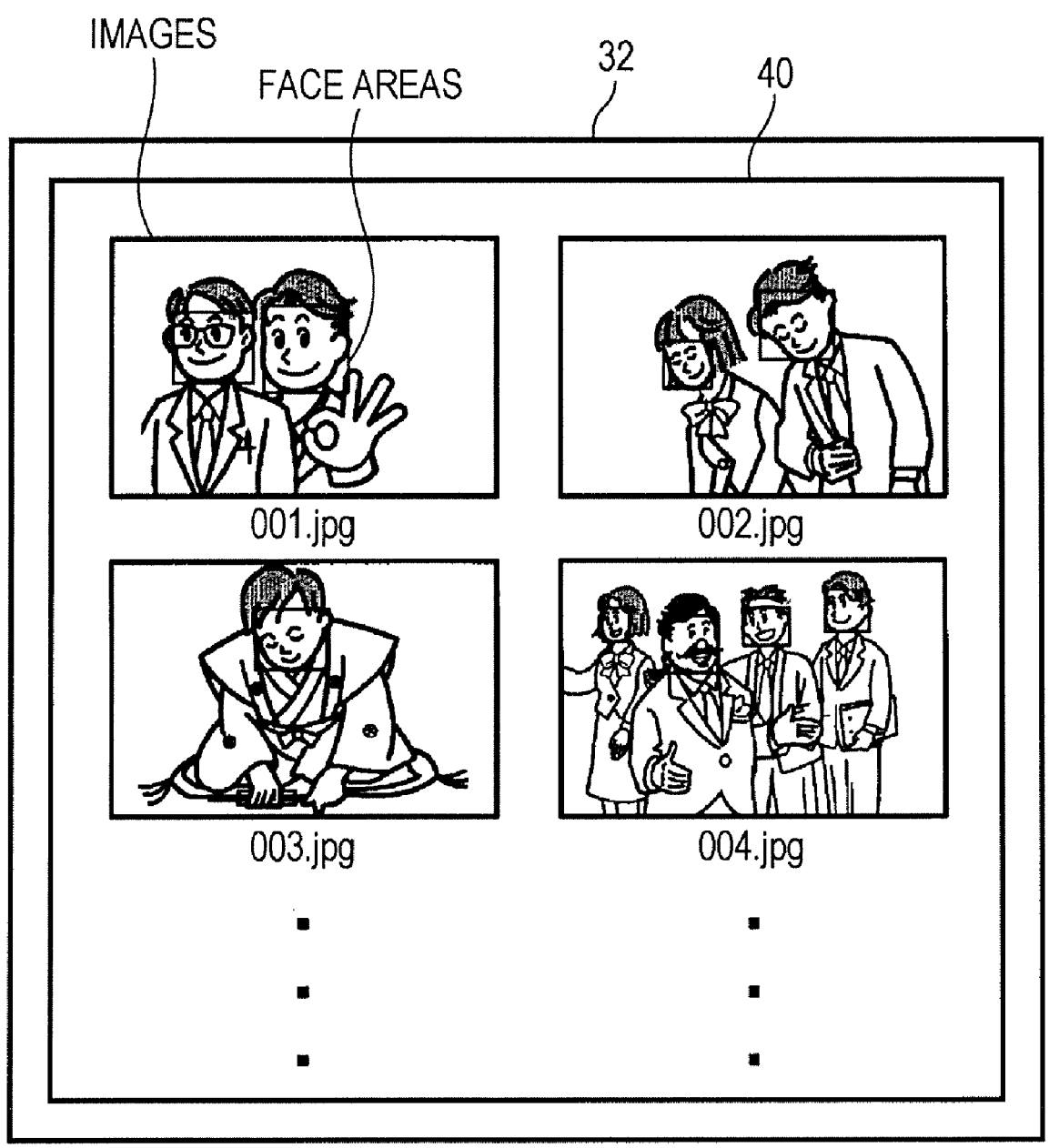
FIG. 3 is a diagram that schematically illustrates an example of a display screen picture that is displayed on a display unit when face area detection is performed for each image.

When the layout image creation processing routine is started, as a first step, the CPU 22 detects a face area (or face areas) of a person(s) in each of the plurality of images selected by the user (step S100). The face area is detected as follows. Among the entire pixels of an image, pixels that fall within a predetermined flesh color range are extracted as pixels having flesh color (hereinafter referred to as "flesh color pixels"). An area of flesh color pixels that has predetermined characteristics is calculated on the basis of the extracted flesh color pixels. For example, a region where the flesh color pixels are arranged in a shape corresponding to a face and occupy a predetermined area size is found as the area of the flesh color pixels. An area that is located slightly above the center of the calculated area of the flesh color pixels and has a brightness value that is lower than that of the area of the flesh color pixels is extracted as an eye area. An area that is located below the area of eyes and has a brightness value that is lower than that of the area of the flesh color pixels is extracted as a mouth area. When the areas of eyes and a mouth are extracted, a rectangular boundary line is drawn to enclose the area of the flesh color pixels. The area demarcated by the line is detected as the face area. FIG. 3 is a diagram that schematically illustrates an example of a display screen picture 40 that is displayed on the display unit 32 when face area detection is performed for each image. In FIG. 3, "001. jpg" indicates a file name. Each area surrounded by a solid line in each image indicates a face area. In the present embodiment of the invention, data set in each of processing steps including the step S100 is stored in a predetermined address of the RAM 24.

Figure 4:
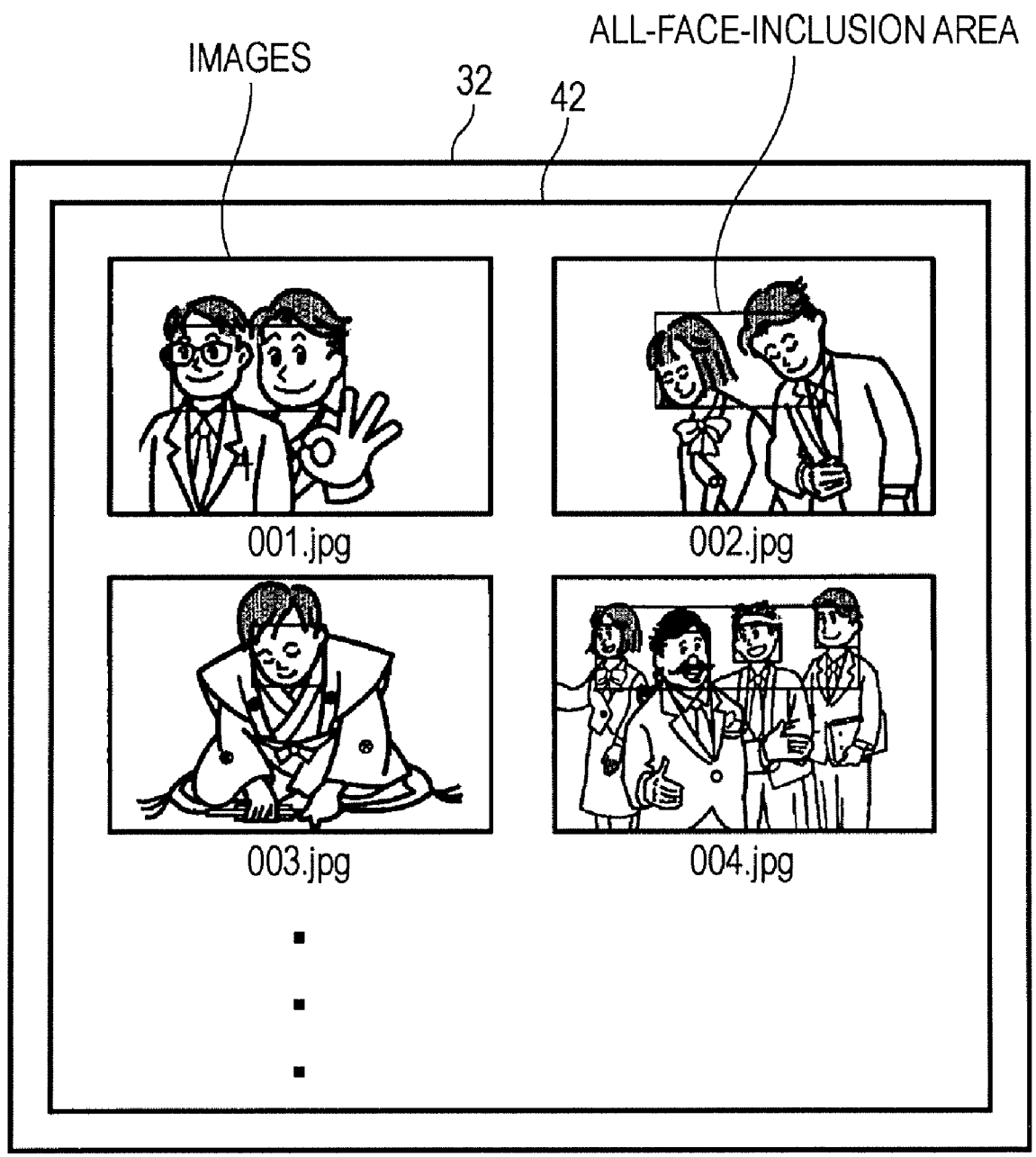
FIG. 4 is a diagram that schematically illustrates an example of a display screen picture that is displayed on the display unit when an all-face-inclusion area is set for each image.

After the completion of face area detection for each image, an all-face-inclusion area is set for each image (step S110). The all-face-inclusion area is a rectangular area that includes all of the face areas in the image. Next, in order to ensure that faces in the respective images are oriented in order (vertically and horizontally), an image(s) is rotated with predetermined angular increments (e.g., steps of 90°) if needed (step S120). The all-face-inclusion area is set for each image as follows. If the number of face areas included in the image is one, the face area is set as the all-face-inclusion area. If the number of face areas included in the image is two or greater, a rectangular area that includes all of the face areas and has a minimum size is set as the all-face-inclusion area. FIG. 4 is a diagram that schematically illustrates an example of a display screen picture 42 that is displayed on the display unit 32 when an all-face-inclusion area is set for each image. In FIG. 4, "001. jpg" indicates a file name. The area surrounded by a solid line in each image indicates an all-face-inclusion area.

Next, a reference image is selected among a plurality of images (step S130). The reference image is selected as follows. If the number of images that includes the maximum number of face areas is one, the image is selected as the reference image among the plurality of images. If the number of images that include the maximum number of face areas is two or greater, the image that has a larger or the largest horizontal-to-vertical ratio of the all-face-inclusion area is selected as the reference image. Notwithstanding the above, other parameter may be used for the selection of the reference image in a case where the number of images that include the maximum number of face areas is two or greater. For example, among two or more images that include the maximum number of face areas, the image that includes the face area having the largest size may be selected as the reference image.

Figure 5:
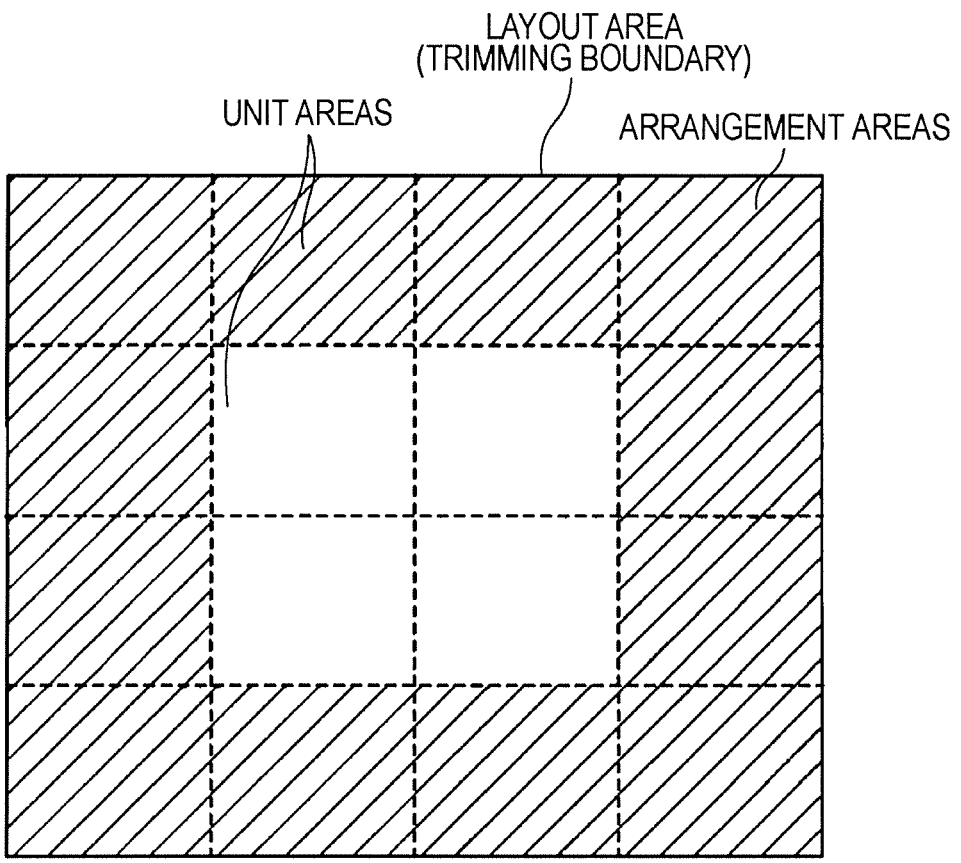
FIG. 5 is a diagram that schematically illustrates an example of the array of unit areas and arrangement areas.

Then, in a step S140, the boundary (i.e., frame) of the layout area is set as a frame for trimming an image, which will be performed in a step S230 as described later. The frame for trimming an image is hereinafter referred to as a trimming boundary. Next, the layout area is divided on the basis of the number of images set by the user and the layout area itself to set a plurality of unit areas where the images are to be assigned respectively (step S150). Among the plurality of unit areas, some unit areas are set as arrangement areas (i.e., areas to be used for placement of images); the arrangement areas are unit areas where no image has been placed yet; in addition, the arrangement areas are unit areas each of which has at least one on-frame side on the trimming boundary (step S160). The plurality of unit areas is set as follows. The layout area is equi-sectioned into unit areas whose number is equal to or greater than the number of images selected by the user and is minimum among numbers that enable the layout area to be equi-sectioned while maintaining the horizontal-to-vertical ratio (e.g., aspect ratio) of the layout area within a predetermined allowable range. In the present embodiment of the invention, the user selects sixteen images as explained earlier. Therefore, in this example, the unit areas are set and arranged in four columns and four rows (i.e., 4×4 matrix array). An example of the array of the unit areas and the arrangement areas is illustrated in FIG. 5. In FIG. 5, a solid line represents the boundary of the layout area (i.e., trimming boundary). Each broken line represents a border between two unit areas arranged next to each other. Each hatched unit area represents an arrangement area. In the processing of the steps S150 and S160, at least one unit area will be left as a blank area where no image will be placed in a case where the number of the unit areas is greater than the number of the images, and in addition, in a case where all of the unit areas are set as the arrangement areas. For example, in a case where the number of the images selected by the user is three, and in addition, in a case where four unit areas are set, one unit area will be left as a blank area where no image will be placed. In order to avoid any unit area from being left blank, in such a case, the layout area is equi-sectioned on the basis of the number of the images to reset a plurality of unit areas. In a case where the number of the images is any odd number, there is a greater possibility that the all-face-inclusion area is lengthened in the horizontal direction in comparison with the vertical direction when there is more than one face area included in each image. In consideration of such a possibility, the layout area may be equi-sectioned in such a way as to set a plurality of unit areas in the vertical direction.

Figure 6:
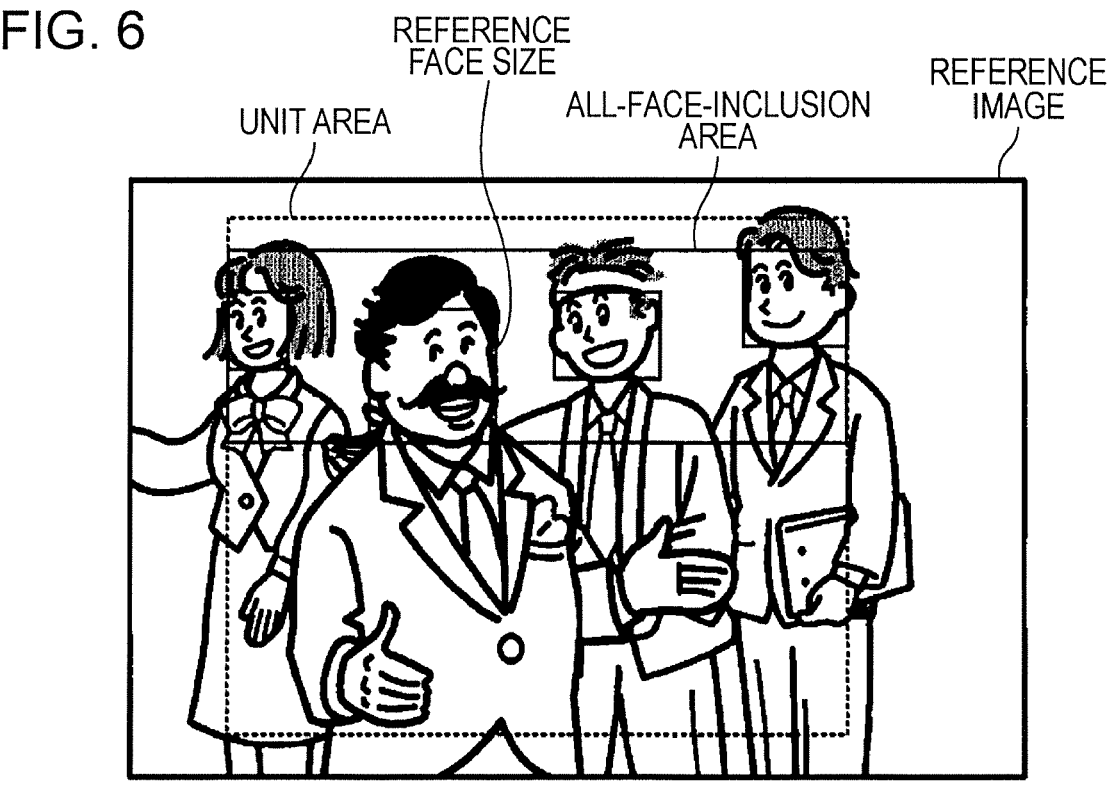
FIG. 6 is a diagram that schematically illustrates an example of the adjustment of the size of a reference image and the setting of a reference face size.

Next, the size of the reference image is adjusted on the basis of the size of a unit area while maintaining the horizontal-to-vertical ratio of the reference image (step S170). Then, among the face areas included in the size-adjusted reference image, the size of one face area that is the largest is set as a reference face size (step S180). The size of the reference image is adjusted within the following scaling range. The size of the reference image after the adjustment is not smaller than the size of a unit area. In addition, the all-face-inclusion area of the reference image after the adjustment is included in the unit area. The size of the reference image is adjusted within the above scaling range while keeping its horizontal-to-vertical ratio in such a manner that, among four sides (i.e., boundary frame) of the all-face-inclusion area of the reference image after the adjustment, two sides that are parallel to each other coincide with a part of the area frame of the unit area. In other words, these two sides after the adjustment are exactly on the boundary of the unit area. An example of the adjustment of the size of the reference image and the setting of the reference face size is illustrated in FIG. 6. Since the reference face size is set as explained above, it is possible to make the reference face size relatively large.

After the setting of the reference face size, the size of each of the remaining images, which excludes the reference image, is adjusted on the basis of the size of one face area that is the largest among the face areas included in the image (hereinafter referred to as the largest face area), the reference face size, the size of the image itself, and the size of a unit area (step S190). The size of each of the remaining images is adjusted within a range in which the size of the image after the adjustment is not smaller than the size of a unit area, and in addition, the frame (i.e., boundary) of the all-face-inclusion area of the image after the adjustment is included in the unit area. The size of the image is adjusted within the above range while keeping its horizontal-to-vertical ratio in such a manner that the size of the largest face area approximates to the reference face size (for example, the area size of the largest face area approximates to that of the reference face size, or at least either the two long sides of the largest face area or the two short sides of the largest face area approximate to the frame of the reference face size). The reason why the size of the image after the adjustment is not smaller than the size of the unit area is to avoid any area space to be left blank when the image is assigned to the unit area. The reason why the frame of the all-face-inclusion area of the image after the adjustment is included in the unit area is to avoid any part of the face area(s) from being positioned outside the unit area when the image is assigned to the unit area. In other words, the size of the image is adjusted while ensuring that the boundary of the all-face-inclusion area is included in the unit area in order to avoid any part of the face area(s) from being hidden by another image that will be placed later. Since the size of each image is adjusted as explained above, the size of the face areas included in the images is made uniform as much as possible. Therefore, it is possible to avoid any face area that is extremely large or extremely small from being included in a final layout image, that is, a layout image created as a final output.

Thereafter, a placement order is set (step S200). The placement order is a sequential order in which the images are placed on the respective unit areas. The placement order is set in accordance with predetermined conditions. For example, the images are placed in ascending order of the number of the face areas included in the images. If there are two or more images that include the same number of the face areas, these images are placed in increasing order of the size of the largest face area.

Figure 7:
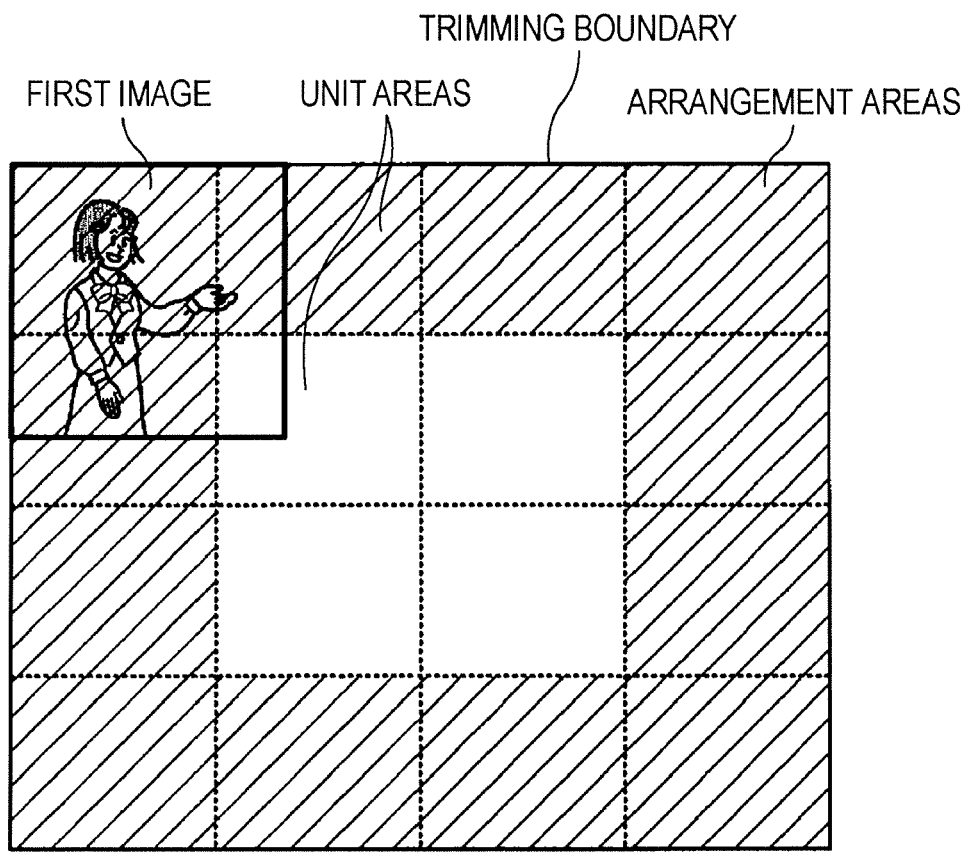
FIG. 7 is a diagram that schematically illustrates an example of the placement of a first image in sequence in an arrangement area.

Next, an image that is to be placed at a unit area (i.e., an arrangement area) is selected (step S210). Then, the selected image is placed at the arrangement area (step S220). At the same time, the image is trimmed (step S230). In the trimming, every part of the image outside the trimming boundary is trimmed off. In addition, trimming is performed at a border between the unit area where the selected image is currently placed and an adjacent unit area(s) where another image has already been placed in the preceding (or previous) placement processing, if any. The image that has already been placed is hereinafter referred to as an "already-placed" image. In other words, trimming is performed at the "already-placed-image-side border" viewed from the image that is currently placed in the arrangement area besides the trimming boundary. When the selected image is placed at the arrangement area, the image is positioned in such a way as to ensure that the distance between the center of the all-face-inclusion area and the center of the unit area is small within a range in which no gap (e.g., blank space) is formed in the unit area. By this means, it is possible to avoid the formation of any gap in the unit area where the image is placed. An example of the placement of a first image in the sequence in an arrangement area and trimming thereof is illustrated in FIG. 7. As illustrated therein, in the present embodiment of the invention, the first image is placed at the upper left unit area (i.e., arrangement area). Through the processing of the steps S220 and S230, an image can be placed on an arrangement area without hiding any "already-placed" image. In addition, no part of the image is located outside the trimming boundary. It is not necessary to trim off a part of the currently placed image that is outside the arrangement area but does not overlap any "already-placed" image and, in addition, is not located outside the trimming boundary. The reason why such a part does not have to be trimmed off is that the part will be hidden later when, among the plurality of the images, an image that has not been placed on the layout area yet (hereinafter referred to as a "yet-to-be-placed image") will have been placed at a unit area where no image has been placed yet (hereinafter referred to as a "yet-to-be-filled arrangement area") in the layout area in future. Though it is not necessary to trim off such a part for the above reason, the part may be trimmed off together with the trimming-required part(s) explained earlier.

Next, it is judged whether images have been arranged at all of the arrangement areas, respectively, or not (steps S240 and S250). A state in which the arrangement of images at all arrangement areas has been completed is hereinafter referred to as an "all-arrangement-completed state". If not in the all-arrangement-completed state, the process returns to the step S200. Then, a series of processing from the step S200 to the step S250 is repeated. In this way, the images are placed at the arrangement areas sequentially. In the present embodiment of the invention, the images are sequentially placed at the arrangement areas clockwise. However, the sequential placement of the images at the arrangement areas is not limited to clockwise placement. For example, the images may be sequentially placed at the arrangement areas counterclockwise. Or, the images may be placed at the arrangement areas in a random manner.

Figure 8:
FIG. 8 is a diagram that schematically illustrates an example of an all-arrangement-completed state.
Figure 9:
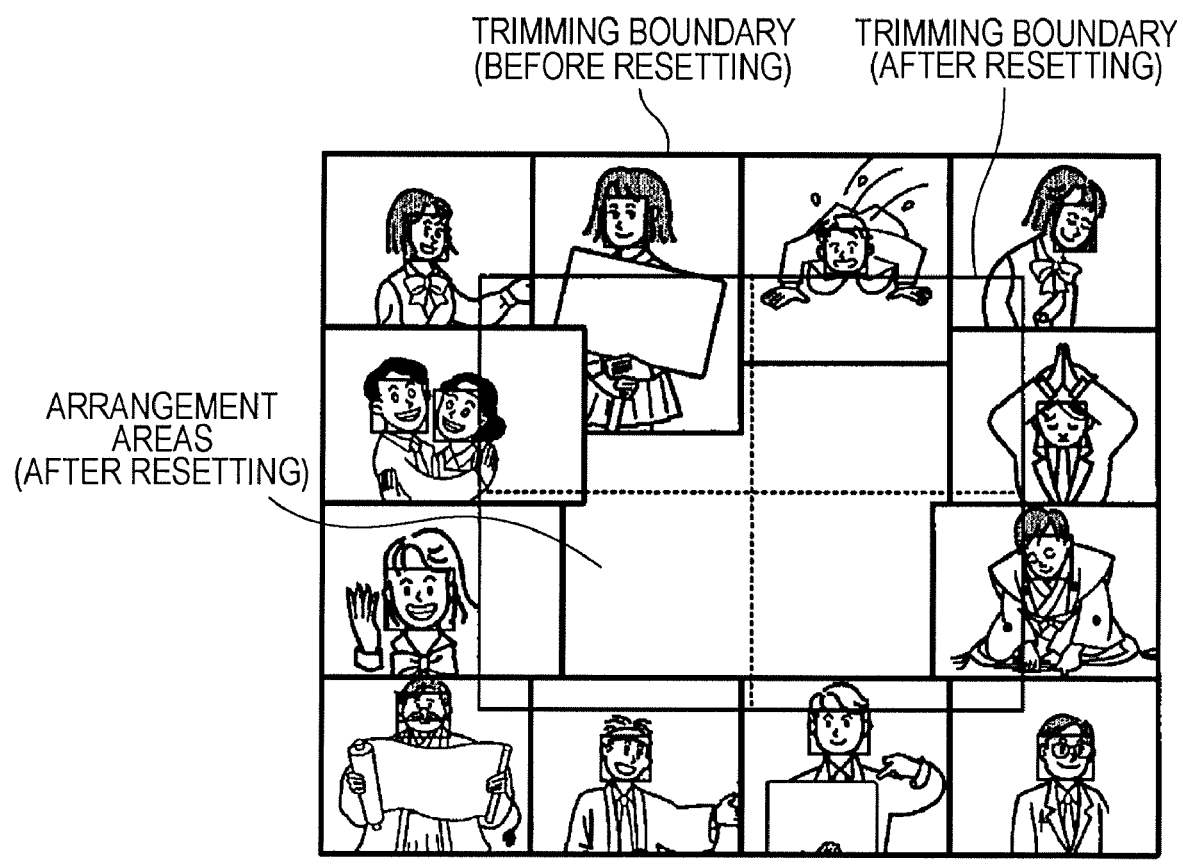
FIG. 9 is a diagram that schematically illustrates an example of a trimming boundary before and after resetting as well as reset unit areas.

If it is judged that the state is in the all-arrangement-completed state (step S250: YES), it is judged whether there is any yet-to-be-placed image or not (step S260). The all-arrangement-completed state is illustrated in FIG. 8. If there is any yet-to-be-placed image, the trimming boundary is reset (step S270). Next, unit areas are reset on the basis of the reset trimming boundary and the number of the yet-to-be-placed images (step S280). Then, the process returns to the step S160. In the step S160, arrangement areas are reset on the basis of the reset trimming boundary and the reset unit areas. Thereafter, the step S170 and the subsequent steps are executed again. In the resetting of the trimming boundary, the boundary is set again in such a way as to demarcate an area that includes all of the yet-to-be-filled arrangement areas and has a maximum size while ensuring that (i.e., within a range that ensures that) none of the face areas included in the already-placed images will be hidden thereby. In the present embodiment of the invention, the trimming boundary is reset in such a manner that each of four sides of the area demarcated by the trimming boundary after the resetting is tangential to an inner side of a face area (e.g., the innermost face area at the side) included in the already-placed images. Thus, the area demarcated by the trimming boundary after the resetting adjoins these face areas. An example of the trimming boundary reset as explained above is illustrated in FIG. 9. Besides the trimming boundary after the resetting, FIG. 9 shows an example of unit areas after the resetting, which is explained below. The resetting of unit areas is performed as follows. If the number of the yet-to-be-placed images is one, the entire area that is demarcated by the trimming boundary after the resetting is set as the reset unit area. If the number of the yet-to-be-placed images is two or greater, the area demarcated by the trimming boundary after the resetting (hereinafter referred to as a "trimming boundary area") is equi-sectioned into unit areas whose number is equal to or greater than the number of the yet-to-be-placed images and is minimum among numbers that enable the trimming boundary area to be equi-sectioned while maintaining the horizontal-to-vertical ratio of the trimming boundary area within a predetermined range of tolerance. In the processing of the steps S280 and S160, at least one unit area will be left as a blank area where no image will be placed in a case where the number of the unit areas is greater than the number of the yet-to-be-placed images, and in addition, in a case where all of the unit areas are set as the arrangement areas. For example, in a case where the number of the yet-to-be-placed images is three, and in addition, in a case where four unit areas are set, one unit area will be left as a blank area where no image will be placed. In order to avoid any unit area from being left blank, in such a case, the trimming boundary area is equi-sectioned on the basis of the number of the yet-to-be-placed images to reset a plurality of unit areas. In a case where the number of the yet-to-be-placed images is any odd number, there is a greater possibility that the all-face-inclusion area is lengthened in the horizontal direction in comparison with the vertical direction when there is more than one face area included in each image. In consideration of such a possibility, the trimming boundary area may be equi-sectioned in such a way as to set a plurality of unit areas in the vertical direction. Arrangement areas after the resetting are either located at the center of the layout area or relatively close to the center of the layout area in comparison with arrangement areas before the resetting. In the present embodiment of the invention, when the plurality of images is placed sequentially in the layout area, images are placed first at outer areas, which are relatively remote from the center of the layout area, before placement at inner central areas. Therefore, among the plurality of images, it is possible to place images that include a relatively large number of face areas at the center of the layout area or at center-side areas, which are relatively close to the center of the layout area. In other words, it is possible to arrange images that are placed later at the center area or at the center-side areas. In addition, in the present embodiment of the invention, the size of each of the plurality of images excluding the reference image is adjusted within a range in which the size of the image after the adjustment is not smaller than the size of a unit area, and in addition, the frame of the all-face-inclusion area of the image after the adjustment is included in the unit area. The size of the image is adjusted within the above range while keeping its horizontal-to-vertical ratio in such a manner that the size of the largest face area approximates to the reference face size (which is smaller than the size of the all-face-inclusion area of the reference image). For this reason, the size of the largest face area is usually smaller than that of the unit area. Therefore, the size of a unit area after the resetting step S280 is usually larger than that before the resetting. Thus, both of the size of the reference image that is reset in the step S170 on the basis of the reset arrangement area and the reference face size that is reset in the step S180 on the basis thereof are larger than those before the resetting. Accordingly, the size of each face area in each image that is placed at a reset arrangement area is larger than that before the resetting. As a result, among the plurality of images, it is possible to increase the face-area size of images that include a relatively large number of face areas (i.e., images that are placed later in sequential placement).

Figure 10:
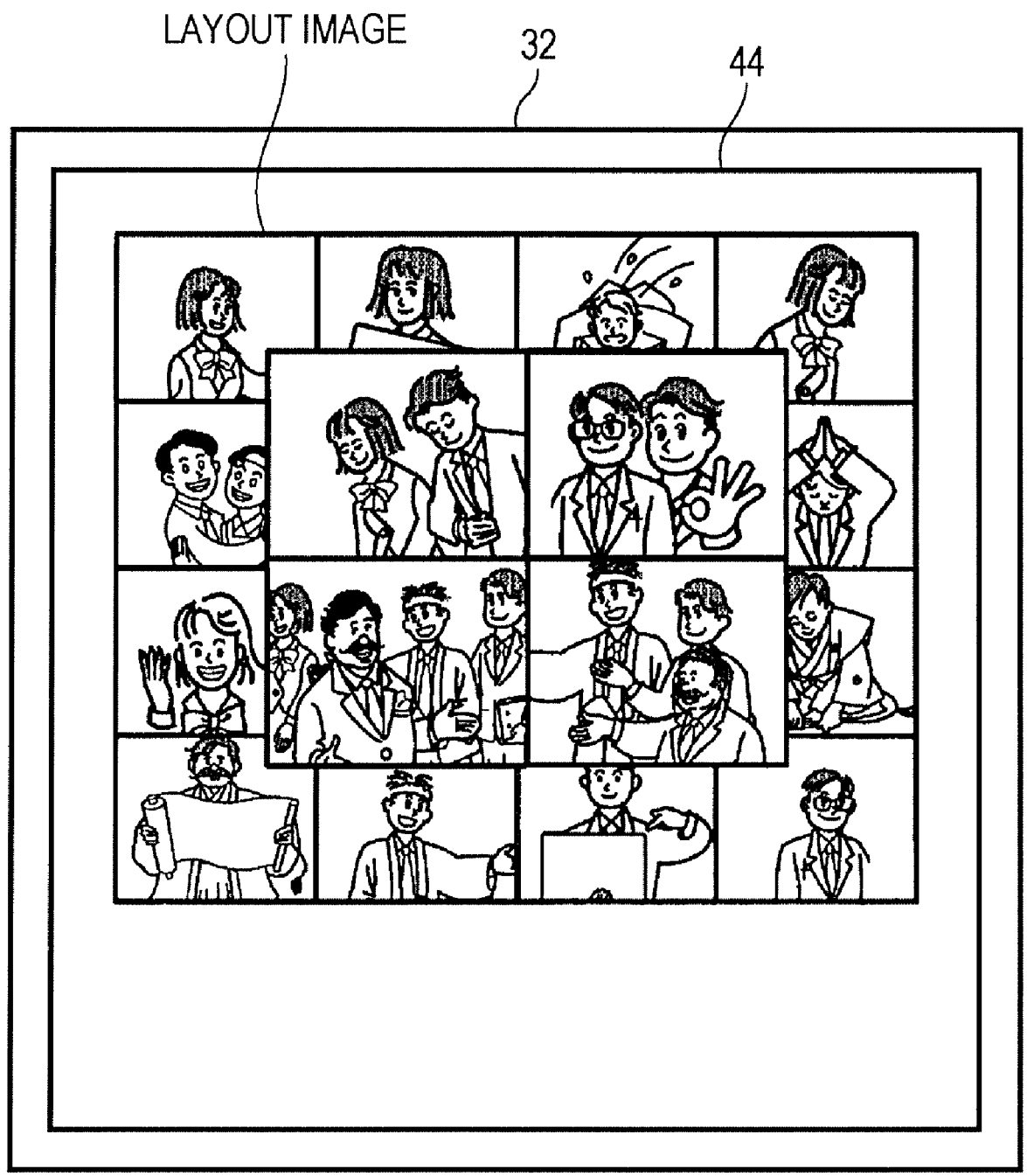
FIG. 10 is a diagram that schematically illustrates an example of a display screen picture that is displayed on the display unit when the creation of a layout image is completed.

A series of processing from the steps S160 to S280 (both inclusive) is repeated as explained above. After the completion of arrangement of all of the images in the layout area, which means that there is not any yet-to-be-placed image (step S260: NO), it is judged that the creation of a layout image is completed. Accordingly, the layout image creation processing routine ends. An example of a display screen picture 44 that is displayed on the display unit 32 upon completing the creation of a layout image is shown in FIG. 10. When a user operates the operation unit 34 to give instructions to the printer 20 for carrying out printing on a print target medium S after the creation of a layout image, the printer 20 prints the layout image on the print target medium S.

In this paragraph, the corresponding relationships between processing steps described in the present embodiment of the invention and constituent elements according to an aspect of the invention are explained. In addition, in this paragraph, the corresponding relationships between components/units described in the present embodiment of the invention and constituent elements according to an aspect of the invention are explained. The processing performed in the step S100 of the layout image creation processing routine according to the present embodiment of the invention corresponds to operation (a) according to an aspect of the invention. The processing performed in the step S110 corresponds to operation (b) according to an aspect of the invention. The processing performed in the steps S140, S150, and S160 corresponds to operation (c) according to an aspect of the invention. The processing performed in the steps S130, S170, and S180 corresponds to operation (d) according to an aspect of the invention. The processing performed in the step S190 corresponds to operation (e) according to an aspect of the invention. The processing performed in the steps S200, S210, S220, S230, S240, S250, S260, S270, S280, and S160 corresponds to operation (f) according to an aspect of the invention. The controller 21 described in the present embodiment of the invention corresponds to a face area detection section, an all-face-inclusion area setting section, a unit area setting section, a reference face size setting section, a size adjustment section, and a layout image creation section according to an aspect of the invention. It should be noted that the explanation of operations of the printer 20 according to an exemplary embodiment of the invention given above provides a descriptive and illustrative support for not only an image processing method according to an aspect of the invention and an image processing apparatus according to an aspect of the invention but also an image processing program according to an aspect of the invention.

As explained in detail above, the printer 20 according to an exemplary embodiment of the invention has the following features and offers the following advantages. One image that includes the maximum number of face areas is selected as a reference image among a plurality of images. The size of each of the remaining images, which excludes the reference image, is adjusted in such a way as to approximate the size of a face area (e.g., the largest face area) included in the image to a reference face size included in the reference image. A layout area is divided into a plurality of unit areas. The images are assigned to (i.e., placed sequentially at) the unit areas (i.e., arrangement areas), thereby creating a layout image. By this means, the size of the face areas included in the images is made uniform as much as possible, which ensures that the face size of persons included in the created layout image is substantially uniform. The size of each of the images is adjusted within a range in which the size of the image after the adjustment is not smaller than the size of a unit area, and in addition, the all-face-inclusion area of the image after the adjustment is included in the unit area. In the sequential placement of the images at the arrangement areas, trimming is performed at the "already-placed-image-side border" viewed from the image that is currently placed in the arrangement area besides a trimming boundary. That is, when the selected image is placed at the arrangement area, every part of the image outside the trimming boundary is trimmed off; in addition, trimming is performed at a border between the unit area where the selected image is currently placed and an adjacent unit area(s) where another image has already been placed in the preceding (or previous) placement processing, if any. Therefore, it is possible to ensure that no area space is left blank when the image is assigned to the unit area and that no face of a person(s) in the image is hidden.

In the processing of the printer 20 according to an exemplary embodiment of the invention, the trimming boundary is reset in a case where there is any yet-to-be-placed image when it is judged that images have been arranged at all of the arrangement areas, respectively, which is defined above as the all-arrangement-completed state. The trimming boundary is reset in such a way as to demarcate an area that includes all of yet-to-be-filled arrangement areas and has a maximum size within a range that ensures that none of the face areas included in the already-placed images will be hidden thereby. In addition, unit areas are reset on the basis of the reset trimming boundary and the number of the yet-to-be-placed images. The size of each yet-to-be-placed image is adjusted on the basis of the reset unit areas (arrangement areas). The yet-to-be-placed images that have been subjected to the size adjustment are sequentially placed at the reset arrangement areas (unit areas). Therefore, it is possible to make the size of the yet-to-be-placed image larger than that before the resetting of the trimming boundary and the resetting of the unit areas, thereby increasing the face-area size of images that include a relatively large number of face areas (i.e., images that are placed later in sequential placement) among the plurality of images.

Needless to say, the invention is not restricted to an exemplary embodiment described above. That is, the invention may be configured or implemented in a variety of modifications without departing from the gist and the spirit thereof, which is encompassed within the technical scope thereof.

In the foregoing embodiment of the invention, it is explained that the size of the reference image is adjusted within a range that ensures that the all-face-inclusion area of the reference image after the adjustment is included in the unit area while keeping its horizontal-to-vertical ratio in such a manner that, among four sides (i.e., boundary frame) of the all-face-inclusion area of the reference image after the adjustment, two sides that are parallel to each other coincide with a part of the area frame of the unit area. However, the scope of the invention is not limited to such an example. That is, the size of the reference image may be adjusted into any value while keeping its horizontal-to-vertical ratio within a range that ensures that the size of the reference image after the adjustment is not smaller than the size of a unit area, and in addition, the all-face-inclusion area of the reference image after the adjustment is included in the unit area.

In the foregoing embodiment of the invention, it is explained that the placement order is set in accordance with predetermined conditions. As an example of the conditions for setting the placement order, it is explained that the images are placed in ascending order of the number of the face areas included in the images. If there are two or more images that include the same number of the face areas, these images are placed in increasing order of the size of the largest face area. However, the scope of the invention is not limited to such an example. The placement order may be set in accordance with other parameter(s) such as, for example, the horizontal-to-vertical ratio of face areas and/or the horizontal-to-vertical ratio of the all-face-inclusion area, the average size of face areas, file names, etc., in addition to or instead of the conditions explained above.

In the foregoing embodiment of the invention, it is explained that the images are placed in ascending order of the number of the face areas included in the images. If there are two or more images that include the same number of the face areas, these images are placed in increasing order of the size of the largest face area. In addition, it is explained that, when the plurality of images is placed sequentially in the layout area, images are placed first at outer areas, which are relatively remote from the center of the layout area, before placement at inner central areas. However, the scope of the invention is not limited to such an example. For example, images may be placed first at inner areas, which are relatively close to the center of the layout area, before placement at outer areas. Or, images may be placed sequentially in rows or in columns (e.g., one line after another). Or, images may be placed sequentially at randomly set areas. Needless to say, the placement conditions are not limited to any of the above.

In the foregoing embodiment of the invention, it is explained that the trimming boundary is reset in a case where there is any yet-to-be-placed image when it is judged that images have been arranged at all of the arrangement areas, respectively. The trimming boundary is reset in such a way as to demarcate an area that includes all of the yet-to-be-filled arrangement areas and has a maximum size within a range that ensures that none of the face areas included in the already-placed images will be hidden thereby. However, the scope of the invention is not limited to such an example. That is, when the trimming boundary is reset to demarcate an area that includes all of the yet-to-be-filled arrangement areas, the demarcated area may have any size within a range that ensures that none of the face areas included in the already-placed images will be hidden thereby.

Figure 11:
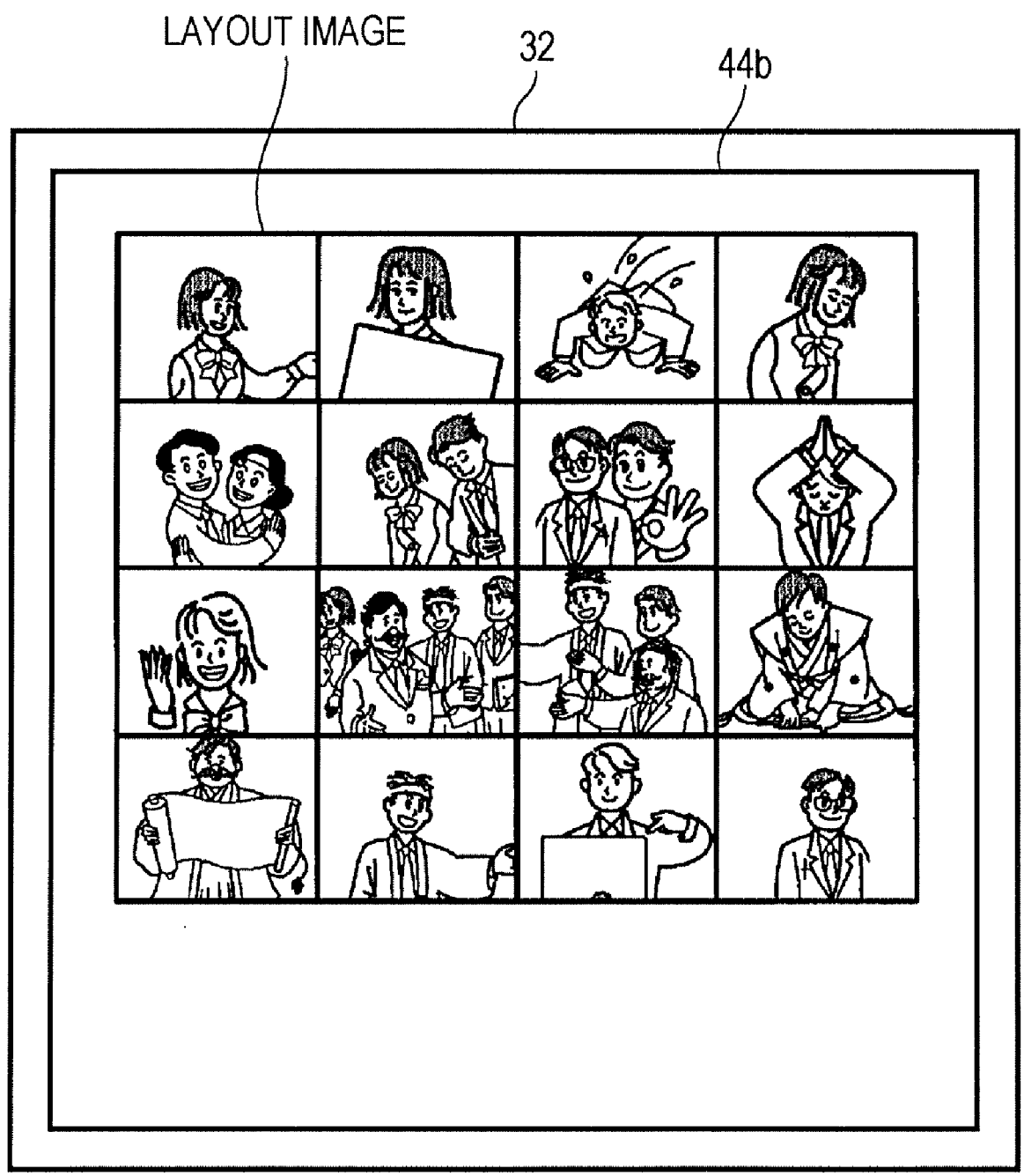
FIG. 11 is a diagram that schematically illustrates an example of a display screen picture that is displayed on the display unit when the resetting of the trimming boundary and the resetting of the unit areas are skipped.

In the foregoing embodiment of the invention, it is explained that the trimming boundary is reset in a case where there is any yet-to-be-placed image when it is judged that images have been arranged at all of the arrangement areas, respectively. The trimming boundary is reset in such a way as to demarcate an area that includes all of the yet-to-be-filled arrangement areas and has a maximum size within a range that ensures that none of the face areas included in the already-placed images will be hidden thereby. In addition, it is explained that unit areas are reset on the basis of the reset trimming boundary and the number of the yet-to-be-placed images. Notwithstanding the foregoing, however, the resetting of the trimming boundary and the resetting of the unit areas may be skipped. To skip the resetting of the trimming boundary and the resetting of the unit areas, the steps S270 and S280 of the layout image creation processing routine illustrated in FIG. 2 are omitted. An example of a display screen picture 44b that is displayed on the display unit 32 (display screen picture 44b that shows a layout image) in a case where the steps S270 and S280 are omitted is illustrated in FIG. 11.

Figure 12:
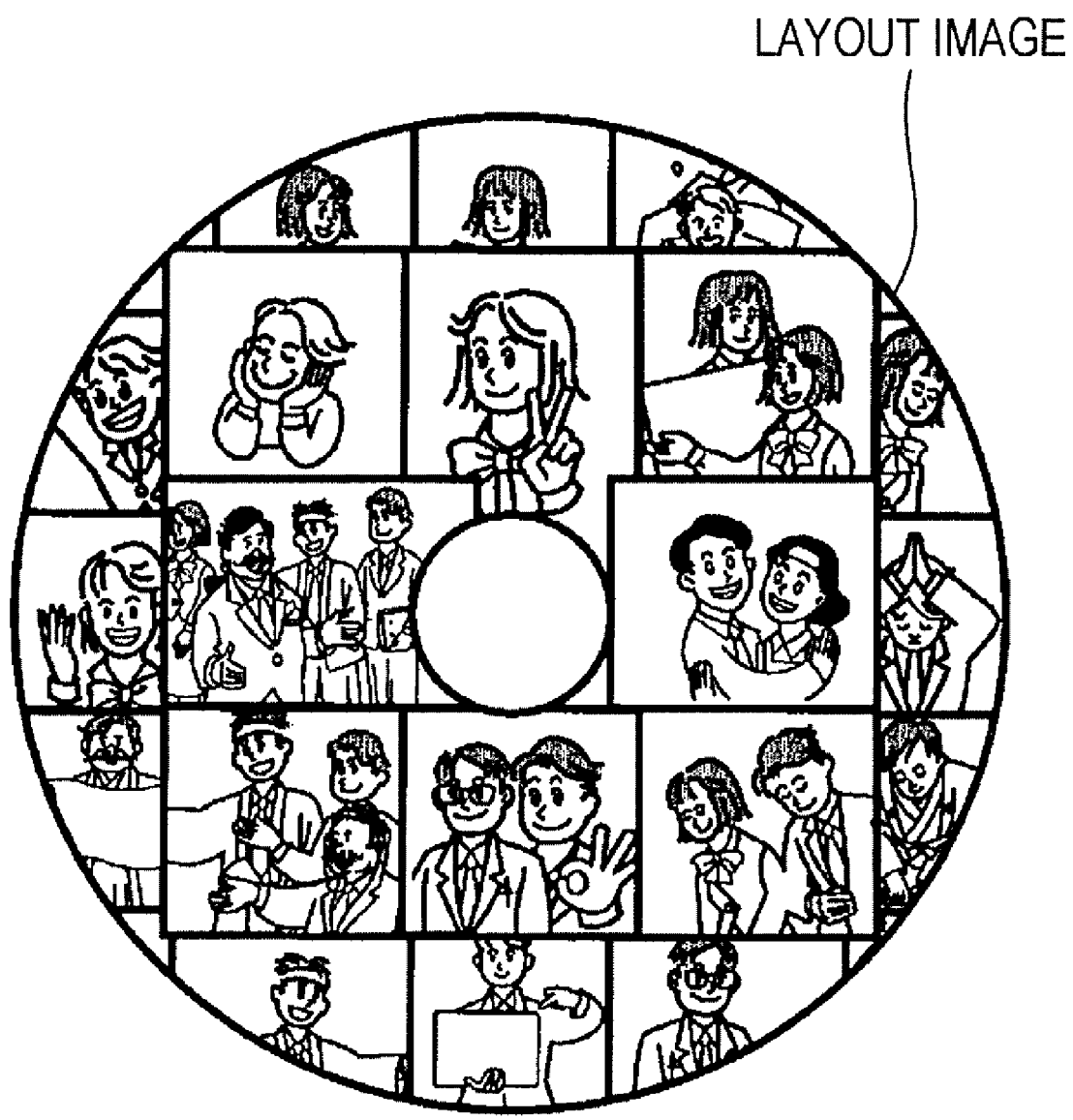
FIG. 12 is a diagram that schematically illustrates an example of a layout image according to a modification example of the invention.

In the foregoing embodiment of the invention, the creation of a layout image by arranging a plurality of images selected by a user in a rectangular layout area is explained. However, the shape of the layout area is not limited to a rectangular area. For example, the layout area may have a circular shape, a doughnut shape, or the like. An example of a layout image that is created by arranging a plurality of images in a doughnut-shaped layout area is illustrated in FIG. 12.

Though it is explained in the foregoing embodiment of the invention that the printer 20 prints a layout image created by arranging a plurality of images in a layout area on the print target medium S, the created image may be merely displayed on the display unit 32 and/or stored in the memory card 12 without print execution.

In the foregoing embodiment of the invention, it is explained that the face areas of human are detected. As a modification, the face areas of animal may be detected.

In the foregoing embodiment of the invention, an image processing apparatus is mainly explained using the printer 20 as an example. Besides an image processing apparatus, however, the disclosed technique for creating a layout image by arranging a plurality of images in a layout area where images can be arranged encompasses an image processing method and a program for executing the image processing method as some aspects of the invention.

The entire disclosure of Japanese Patent Application No: 2009-017995, filed Jan. 29, 2009 expressly incorporated by reference herein

What is claimed is:

1. An image processing method for creating a layout image by arranging a plurality of images in a layout area where images can be arranged, the image processing method comprising:
   detecting a face area or face areas in each of the plurality of images;
   setting an all-face-inclusion area that includes all of the face areas detected in the face area detection operation for each of the plurality of images;
   setting a plurality of unit areas where the plurality of images are to be arranged by dividing the layout area on the basis of the number of the plurality of images and the layout area itself;
   selecting a maximum-face-number image, which is an image that includes the maximum number of the face areas detected in the face area detection operation, as a reference image among the plurality of images, adjusting the size of the reference image while keeping the horizontal-to-vertical ratio of the reference image within a range that ensures that the size of the reference image after the adjustment is not smaller than the size of a unit area set in the unit area setting operation and that the all-face-inclusion area set in the all-face-inclusion area setting operation is included in the unit area set in the unit area setting operation, and setting the size of one face area that is the largest among the face areas detected in the face area detection operation after the size adjustment as a reference face size;
   adjusting the size of each of the remaining images, which excludes the reference image, while keeping the horizontal-to-vertical ratio of the image within a range that ensures that the size of the image after the adjustment is not smaller than the size of a unit area set in the unit area setting operation and that the all-face-inclusion area set in the all-face-inclusion area setting operation is included in the unit area set in the unit area setting operation in such a way as to approximate the size of the largest face area included in the image to the reference face size; and
   creating a layout image by sequentially arranging the plurality of images at the unit areas set in the unit area setting operation with trimming at a border between the unit area where the image is currently arranged and an adjacent unit area where another image has already been arranged in preceding or previous arrangement processing, if any, besides trimming of any part of the image outside the layout area.

2. The image processing method according to claim 1,
   wherein the all-face-inclusion area setting operation is processing of setting the all -face-inclusion area that has a rectangular shape for each of the plurality of images;
   the unit area setting operation is processing of setting the plurality of unit areas each of which has a rectangular shape by dividing the layout area; and
   the reference setting operation is processing of adjusting the size of the reference image within a range that ensures that the all-face-inclusion area set in the all-face-inclusion area setting operation is included in the unit area set in the unit area setting operation in such a manner that two sides of the all-face-inclusion area of the reference image that are parallel to each other are on boundary of the unit area.

3. The image processing method according to claim 1, wherein the reference setting operation is processing of selecting one image that has a larger or the largest horizontal-to-vertical ratio of the all-face-inclusion area as the reference image if the number of the maximum-face-number images is two or greater, adjusting the size of the reference image, and setting the reference face size.

4. The image processing method according to claim 1, wherein the layout image creation operation is processing of setting an arrangement order for arranging each of the plurality of images at the corresponding one of the plurality of unit areas set in the unit area setting operation according to conditions that include arrangement in ascending order of the number of the face areas of the plurality of images, which are detected in the face area detection operation, and arranging the plurality of images sequentially in the layout area first at areas that are relatively remote from the center of the layout area before arrangement at central areas.

5. The image processing method according to claim 4,
   wherein the unit area setting operation is processing of setting the boundary of the layout area as a trimming boundary, which is a boundary for trimming performed in the layout image creation operation, and setting at least some unit areas of the plurality of unit areas as arrangement areas, each of which is a unit area where no image has been arranged and, in addition, has at least one side on the trimming boundary;
   the layout image creation operation is processing that includes
      an image arrangement sub-operation, which is processing of arranging each of the plurality of images at the corresponding one of the plurality of arrangement areas sequentially in the arrangement order, and
      a resetting sub-operation, which is processing that includes resetting the trimming boundary in a case where, among the plurality of images, there is any yet-to-be -arranged image, which is an image that has not been arranged on the layout area yet, when images have been arranged at all of the arrangement areas, respectively, in such a way as to demarcate an area that includes all of yet-to-be-filled arrangement areas, which are unit areas where no image has been arranged yet, within a range that ensures that none of the face areas included in already-arranged images, which are images that have already been arranged, will be hidden, resetting the unit areas with the use of the reset trimming boundary, and resetting the arrangement areas with the use of the reset trimming boundary and the reset unit areas;
   the reference setting operation is processing of readjusting the size of the reference image on the basis of the reset unit areas and resetting the reference face size in a case where the unit areas are reset in the resetting sub-operation; and
   the image size adjustment operation is processing of readjusting the size of each of the remaining images on the basis of the reset reference face size in a case where the reference face size is reset in the reference setting operation.

6. The image processing method according to claim 5, wherein the resetting sub-operation is processing of resetting the trimming boundary in such a way as to demarcate a rectangular area that has a maximum size within a range that ensures that none of the face areas included in the already-arranged images will be hidden.

7. The image processing method according to claim 5,
wherein the unit area setting operation is processing of setting the plurality of unit areas by equi-sectioning the layout area into the unit areas whose number is equal to or greater than the number of the plurality of images and is minimum among numbers that enable the layout area to be equi-sectioned while maintaining the horizontal-to-vertical ratio of the layout area within a predetermined range of tolerance, where the layout area is equi-sectioned on the basis of the number of the plurality of images to reset the plurality of unit areas in a case where the number of the plurality of unit areas is greater than the number of the plurality of images, and in addition, in a case where all of the unit areas are set as the arrangement areas; and the resetting sub-operation is processing of setting an entire area that is demarcated by the reset trimming boundary, that is, an entire trimming boundary area, as the reset unit area in a case where the number of the yet-to-be-arranged images is one or resetting the plurality of unit areas by equi-sectioning the trimming boundary area into the unit areas whose number is equal to or greater than the number of the yet-to-be-arranged images and is minimum among numbers that enable the trimming boundary area to be equi-sectioned while maintaining the horizontal-to-vertical ratio of the trimming boundary area within a predetermined range of tolerance, where the trimming boundary area is equi-sectioned on the basis of the number of the yet-to-be-arranged images to reset the plurality of unit areas in a case where the number of the plurality of unit areas is greater than the number of the yet-to -be-arranged images, and in addition, in a case where all of the unit areas are set as the arrangement areas.

8. The image processing method according to claim 1, wherein the layout image creation operation is processing of arranging each of the plurality of images at the corresponding one of the plurality of unit areas set in the unit area setting operation in such a way as to ensure that a distance between the center of the all-face-inclusion area set in the all-face-inclusion area setting operation and the center of the unit area is small within a range in which no gap is formed in the unit area.

9. A program that causes at least one computer to execute each operation of the image processing method according to claim 1.

10. An image processing apparatus for creating a layout image by arranging a plurality of images in a layout area where images can be arranged, the image processing apparatus comprising:

a face area detection section that detects a face area or face areas in each of the plurality of images;

an all-face-inclusion area setting section that sets an all-face-inclusion area that includes all of the detected face areas for each of the plurality of images;

a unit area setting section that sets a plurality of unit areas where the plurality of images are to be arranged by dividing the layout area on the basis of the number of the plurality of images and the layout area itself;

a reference face size setting section that selects a maximum-face-number image, which is an image that includes the maximum number of the detected face areas, as a reference image among the plurality of images, adjusts the size of the reference image while keeping the horizontal-to-vertical ratio of the reference image within a range that ensures that the size of the reference image after the adjustment is not smaller than the size of a set unit area and the set all-face-inclusion area is included in the set unit area, and sets the size of one face area that is the largest among the detected face areas after the size adjustment as a reference face size;

a size adjustment section that adjusts the size of each of the remaining images, which excludes the reference image, while keeping the horizontal-to-vertical ratio of the image within a range that ensures that the size of the image after the adjustment is not smaller than the size of a set unit area and that the set all-face-inclusion area is included in the set unit area in such a way as to approximate the size of the largest face area included in the image to the reference face size; and a layout image creation section that creates a layout image by sequentially arranging the plurality of images at the set unit areas with trimming at a border between the unit area where the image is currently arranged and an adjacent unit area where another image has already been arranged in preceding or previous arrangement processing, if any, besides trimming of any part of the image outside the layout area.

* * * * *